(12) United States Patent
San Martin

(10) Patent No.: US 8,296,113 B2
(45) Date of Patent: Oct. 23, 2012

(54) VIRTUAL STEERING OF INDUCTION TOOL ATTENUATION AND PHASE DIFFERENCE MEASUREMENTS

(75) Inventor: Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 2624 days.

(21) Appl. No.: 09/861,314

(22) Filed: May 18, 2001

(65) Prior Publication Data

US 2003/0023381 A1    Jan. 30, 2003

(51) Int. Cl.
*G06G 7/48* (2006.01)
*G01V 3/18* (2006.01)

(52) U.S. Cl. .............................. 703/10; 702/7
(58) Field of Classification Search ............. 703/10, 703/14; 702/7, 10; 324/303, 332, 339, 343, 324/355

See application file for complete search history.

(56) References Cited

U.S. PATENT DOCUMENTS

| | | | |
|---|---|---|---|
| 3,060,373 A | 10/1962 | Doll | 324/1 |
| 3,119,061 A | 1/1964 | Tanguy | |
| 3,510,757 A | 5/1970 | Huston | 324/6 |
| 4,251,773 A | 2/1981 | Cailliau et al. | 324/347 |
| 4,739,272 A | 4/1988 | Griffin et al. | 324/339 |
| 4,857,852 A | 8/1989 | Kleinberg et al. | 324/339 |
| 4,980,643 A | 12/1990 | Gianzero | 324/339 |
| 5,115,198 A | 5/1992 | Gianzero et al. | 324/339 |
| 5,329,448 A | 7/1994 | Rosthal | 364/422 |
| 5,389,881 A * | 2/1995 | Bittar et al. | 324/338 |
| 5,682,099 A * | 10/1997 | Thompson et al. | 324/338 |
| 5,757,191 A | 5/1998 | Gianzero | 324/339 |
| 5,869,968 A * | 2/1999 | Brooks et al. | 324/338 |
| 5,886,526 A | 3/1999 | Wu | 324/338 |
| 5,966,013 A | 10/1999 | Hagiwara | 324/339 |
| 5,999,883 A | 12/1999 | Gupta et al. | 702/7 |
| 6,184,685 B1 * | 2/2001 | Paulk et al. | 324/338 |
| 6,294,917 B1 * | 9/2001 | Nichols | 324/339 |
| 6,304,086 B1 * | 10/2001 | Minerbo et al. | 324/338 |
| 6,344,746 B1 * | 2/2002 | Chunduru et al. | 324/339 |

FOREIGN PATENT DOCUMENTS

| | | |
|---|---|---|
| DE | 1 423 554 A | 3/1969 |
| WO | 0045195 A | 8/2000 |
| WO | 0050926 A1 | 8/2000 |

OTHER PUBLICATIONS

*The Response of an induction dipmeter and standard induction tools to dipping beds;* Stan Gianzero and Shey-Min Su; Geophysics, vol. 55, No. 9 (Sep. 1990); pp. 1128-1140.

(Continued)

*Primary Examiner* — Hugh Jones
(74) *Attorney, Agent, or Firm* — Mark E. Scott; Conley Rose, P.C.

(57) ABSTRACT

An apparatus and method that provide steerable measurements of attenuation and phase difference are disclosed. In a preferred embodiment, a logging tool is provided with two triads of orthogonal receivers and a triad of orthogonal transmitters. A controller in the logging tool fires selected transmitters singly and in pairs, and determines measurements of ratios between signals received by the receiver triads. The measurement of sixteen ratios is sufficient to allow determination of attenuation and phase difference that would be measured by virtually steered receivers according to equations provided herein.

6 Claims, 3 Drawing Sheets

OTHER PUBLICATIONS

*Directional Induction Logging Methods*; Motoyuki Sato, Jun Fuziwara, Makoto Miyain, Koji Kashihara and Hiroako Niitsuma; Dept. of Resources Engineering, Faculty of Engineering, Tohoku University, Sendai 980-77, Japan.

*Bean Steering an Induction Sonde in Dipping Beds*; Stan Gianzero; Sensor Modeling, Inc. Confidential Research Proposal, Oct. 10, 1994.

*Beam Steering an Induction Sonde in Dipping Beds*; Stan Gianzero; Sensor Modeling, Inc. Confidential Research Proposal, Oct. 24, 1994.

*Method for Iterative Determination of Conductivity in Anisotropic Dipping Formations*, Li Gao et al., U.S. Appl. No. 09/583,184, filed May 30, 2000.

*Method and Apparatus Using Toroidal Antennas to Measure Electrical Anisotropy*, Stanley C. Gianzero, U.S. Appl. No. 60/302,823, filed Jul. 3, 2001.

*Virtual Steering of Induction Tool for Determination of Formation Dip Angle*, Li Gao et al., U.S. Appl. No. 09/925,997, filed Aug. 9, 2001.

*Induction Apparatus and Method for Determining Dip Angle in Subterranean Earth Formations*, Li Gao et al., U.S. Appl. No. 09/927,818, filed Aug. 10, 2001.

French Search Report dated Apr. 28, 2008 for French Patent Application No. 02 05 998.

\* cited by examiner

VIRTUAL STEERING OF INDUCTION TOOL ATTENUATION AND PHASE DIFFERENCE MEASUREMENTS

BACKGROUND

1. Field of the Invention

The present invention generally relates to the measurement of properties of earth formations. More particularly, the present invention relates to a method for virtual steering of induction tool measurements to determine formation properties such as dip angle and formation resistivity.

2. Description of the Related Art

The basic principles and techniques for electromagnetic logging for earth formations are well known. Induction logging to determine the resistivity (or its inverse, conductivity) of earth formations adjacent a borehole, for example, has long been a standard and important technique in the search for and recovery of subterranean petroleum deposits. In brief, the measurements are made by inducing electrical eddy currents to flow in the formations in response to an AC transmitter signal, and measuring the appropriate characteristics of a receiver signal generated by the formation eddy currents. The formation properties identified by these signals are then recorded in a log at the surface as a function of the depth of the tool in the borehole.

Subterranean formations of interest for oil well drilling typically exist in the form of a series relatively thin beds each having different lithological characteristics, and hence, different resistivities. Induction logging is generally intended to identify the resistivity of the various beds. However, it may also be used to measure formation "dip".

Wellbores are generally not perpendicular to formation beds. The angle between the axis of the well bore and the orientation of the formation beds (as represented by the normal vector) has two components. These components are the dip angle and the strike angle. The dip angle is the angle between the wellbore axis and the normal vector for the formation bed. The strike angle is the direction in which the wellbores axis "leans away from" the normal vector. These will be defined more rigorously in the detailed description.

The determination of the dip angle along the length of the well plays an important role in the evaluation of potential hydrocarbon reservoirs and in the identification of geological structures in the vicinity of the well. Such structural and stratigraphic information is crucial for the exploration, production, and development of a reservoir. Further, the dip angle determination may be used to compensate for boundary effects on the resistivity measurements. See Gianzero, U.S. Pat. No. 5,757,191, filed Dec. 9, 1994, hereby incorporated by reference.

An induction dipmeter was first suggested by Moran and Gianzero in "Effects of Formation Anisotropy on Resistivity Logging Measurements" Geophysics, Vol. 44, No. 7, p. 1266 (1979), which is hereby incorporated by reference. A pulsed electromagnetic dipmeter with spatially separated coils was proposed by Gianzero and Su in U.S. Pat. No. 5,115,198, filed September 1989. This patent is also incorporated by reference.

The above dipmeters employ multi-axial transmitter and receiver "triads". Transmitter-receiver coupling measurements may be made along each axis and between axes as well. Because the principle of linear superposition applies to electromagnetic fields, rotational transforms can be used to manipulate the coupling measurements. The measurements of "virtual" transmitters and receivers having arbitrary orientations can be synthesized in this manner.

However, the most reliable induction tools are not configured to measure transmitter-receiver couplings. Rather, they are configured to make inherently compensated measurements of signal attenuation and phase difference between a pair of receiver coils. Unfortunately linear superposition does not apply for signal attenuation and phase differences, so the measurements of these tools cannot be manipulated using existing techniques.

SUMMARY OF THE INVENTION

Accordingly, there is disclosed herein an apparatus and method that provide steerable measurements of attenuation and phase difference. In a preferred embodiment, a logging tool is provided with two triads of orthogonal receivers and a triad of orthogonal transmitters. A controller in the logging tool fires selected transmitters singly and in pairs, and determines measurements of ratios between signals received by the receiver triads. The measurement of sixteen ratios is sufficient to allow determination of attenuation and phase difference that would be measured by virtually steered receivers according to equations provided herein.

BRIEF DESCRIPTION OF THE DRAWINGS

A better understanding of the present invention can be obtained when the following detailed description of the preferred embodiment is considered in conjunction with the following drawings, in which.

Figure 1:
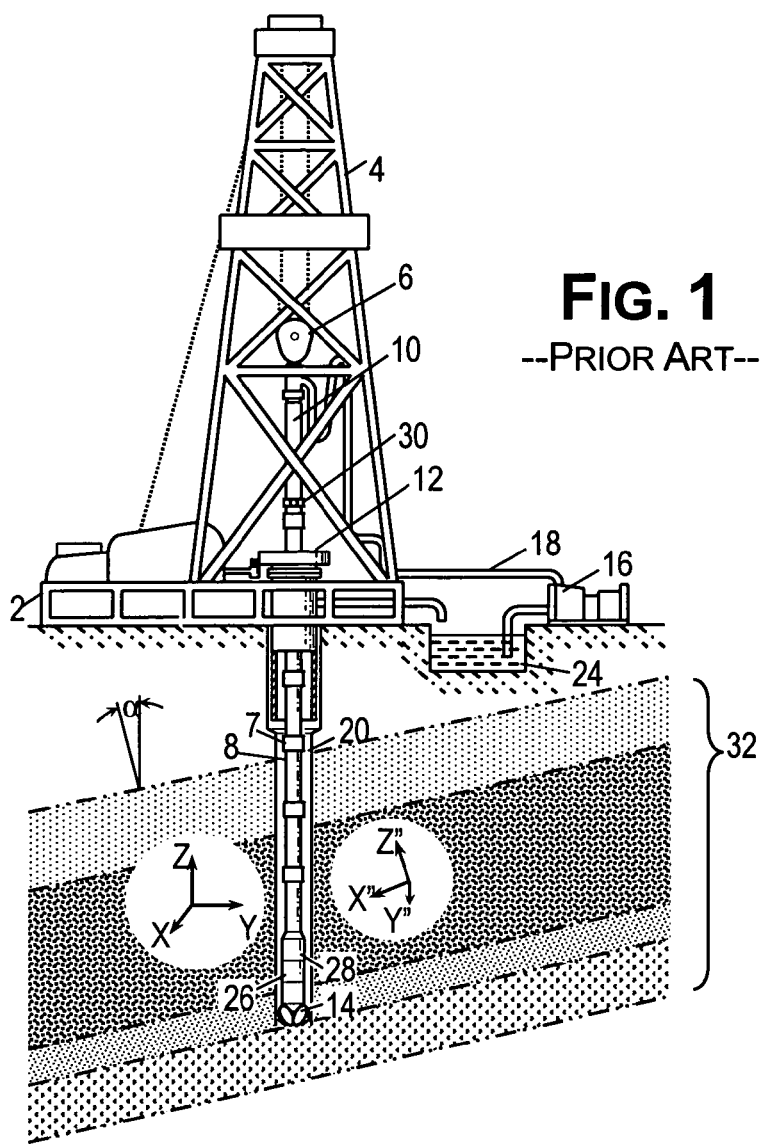
FIG. 1 shows an illustrative environment for employing a LWD tool.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods.

Drilling fluid, termed mud, is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

For Logging While Drilling (LWD) operations, downhole sensors 26 are located in the drill string 8 near the drill bit 14. The sensors 26 preferably include an induction tool having multi-axial transmitters and receivers. In a preferred embodiment, downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques are well known and may be used. The receiver 30 communicates the telemetry to a surface installation (not specifically shown) that processes and stores the measurements. The surface installation typically includes a computer system of some kind, e.g. a desktop computer.

Figure 2:
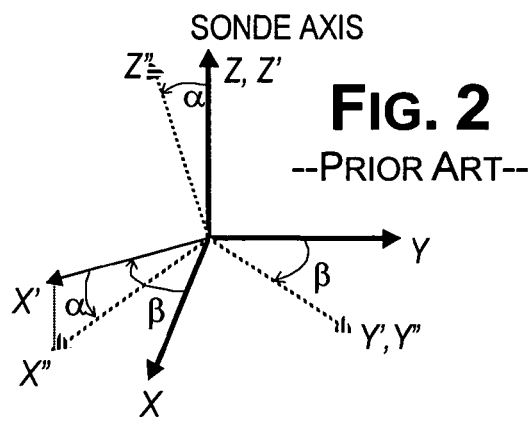
FIG. 2 demonstrates a rotational transformation definition.

The drill bit 14 is shown penetrating a formation having a series of layered beds 32 dipping at an angle. A first (x,y,z) coordinate system associated with the sensors 26 is shown, and a second coordinate system (x",y",z") associated with the beds 32 is shown. The bed coordinate system has the z" axis perpendicular to the bedding plane, has the y" axis in a horizontal plane, and has the x" axis pointing "downhill". As shown in FIG. 2, the two coordinate systems are related by two rotations. Beginning with the sensor coordinate system (x,y,z), a first rotation of angle β is made about the z-axis. The resulting coordinate system is denoted (x',y',z'). Angle β is the strike angle, which indicates the direction of the formation dip. A second rotation of angle α is then made about the y' axis. This aligns the coordinate system with the beds 32. Angle α is the dip angle, which is the slope angle of the beds.

Any vector in one of the coordinate systems can be expressed in terms of the other coordinate system by using rotational transform matrices. Thus, if v is a vector expressed in the (x,y,z) coordinate system, it can be expressed mathematically in the (x",y",z") coordinate system as:

$$v'' = R_\alpha R_\beta v = Rv \tag{1}$$

where $$R = R_\alpha \cdot R_\beta = \begin{bmatrix} \cos\alpha & 0 & -\sin\alpha \\ 0 & 1 & 0 \\ \sin\alpha & 0 & \cos\alpha \end{bmatrix} \begin{bmatrix} \cos\beta & \sin\beta & 0 \\ -\sin\beta & \cos\beta & 0 \\ 0 & 0 & 1 \end{bmatrix} = \begin{bmatrix} \cos\alpha\cos\beta & \cos\alpha\sin\beta & -\sin\alpha \\ -\sin\alpha & \cos\beta & 0 \\ \sin\alpha\cos\beta & \sin\alpha\sin\beta & \cos\alpha \end{bmatrix} \tag{2}$$

Consequently, given measurements in the coordinate system of the induction tool, the corresponding measurements in the coordinate system of the beds can be determined if the dip and strike angles are known. These relationships will be used below for virtual steering. However, the principles of induction tool operation are discussed first.

Figure 3:
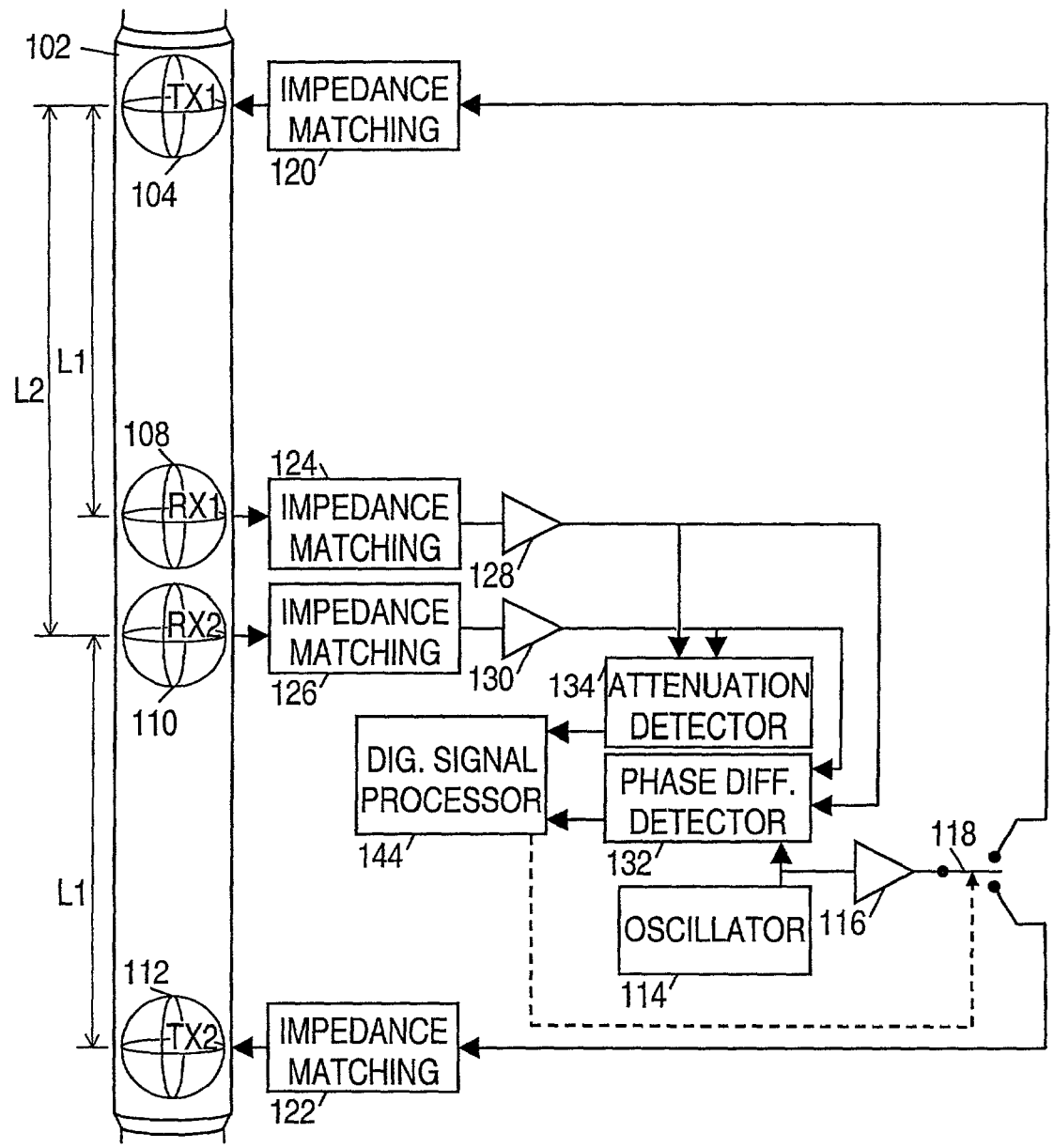
FIG. 3 shows an induction tool that measures attenuation and phase difference.

As with all downhole well components, induction tools are exposed to a harsh environment that includes a wide temperature and pressure range. To avoid a correspondingly wide variation in tool performance, various compensation techniques are employed. One useful compensation technique for induction tools is to provide the tool with a symmetric configuration. FIG. 3 shows one such tool.

Induction tool 102 includes two sets of transmitter coils 104, 112 and two sets of receiver coils 108, 110. As discussed further below, each set may preferably comprise a "triad" of orthogonally oriented coils. Each transmitter coil is preferably excited in turn (time division multiplexing), although frequency division multiplexing may be optionally employed. Receiver coil measurements may be made substantially simultaneously if desired.

In operation, transmitters 104 and 112 alternately transmit interrogating electromagnetic signals that propagate through the wellbore and surrounding formation. Receiver coils 108, 110 detect the interrogating electromagnetic signals and provide a measure of the amplitude attenuation and phase shift between coils 108 and 110. From the amplitude attenuation and phase shift, the resistivity of the formation can be estimated using conventional techniques.

Oscillator 114 generates a sinusoidal signal. Amplifier 116 amplifies the sinusoidal signal and switch 118 routes the amplified signal through one of the impedance matching circuits 120, 122 to the selected transmitter coil. Signals from the receiver coils 108, 110 pass through corresponding impedance matching circuits 124 and 126 and are amplified by corresponding amplifiers 128 and 130. Attenuation detector 134 measures the amplitude of the signals from the amplifiers 128, 130, and determines attenuation by finding the ratio of the signal amplitudes. Phase difference detector 132 measures the phase difference between the signals from amplifiers 128, 130. The digital signal processor 144 reads the attenuation and phase difference measurements from the detectors 132, 134. The digital signal processor controls the setting of switch 118 to measure the attenuation and/or phase shift of signals propagating from any selected transmitter coil. One implementation of attenuation detector 134 and phase difference detector 132 is described in U.S. Pat. No. 5,389,881 (Bittar, et. al.) which is hereby incorporated herein by reference. The digital signal processor 144 preferably provides the attenuation and phase difference measurements to the telemetry transmitter 28 for communication to the surface.

A derivation is now made to demonstrate how two symmetric halves of a resistivity tool can be used to provide compensation. The voltage induced in a receiver coil R by a signal in a transmitter coil T can be written:

$$V = \xi_T \xi_R A e^{i(\phi + \varnothing_T + \varnothing_R)}, \tag{3}$$

where $\xi_T$ and $\xi_R$ are intrinsic efficiencies of the transmitter T and receiver R, respectively, and $\varnothing_T$ and $\varnothing_R$ are intrinsic phase shifts induced by the transmitter T and receiver R, respectively. In subsequent equations, subscripts 1 and 2 will be used to differentiate between the upper and lower transmitter and receiver coils. The ideal amplitude A and ideal phase φ will be provided with subscripts "+" and "−" to indicate whether they correspond to the transmitter receiver spacing of L2 or L1 (L1 and L2 are shown in FIG. 3).

The ratio between voltages induced in the two receiver coils from the upper transmitter is:

$$\frac{V_{R_2 T_1}}{V_{R_1 T_1}} = \frac{\xi_{R_2}}{\xi_{R_1}} \eta_1 e^{i(\delta\varphi_1 + \phi_{R_2} - \phi_{R_1})}, \tag{4}$$

where $\eta_1 = A_+/A_-$ is the ideal attenuation, and $\delta\phi_U = \phi_+ - \phi_-$ is the ideal phase shift in the signal from the upper transmitter. Similarly, the ratio between voltages induced by the lower transmitter is:

$$\sqrt{\frac{V_{R_1T_2}}{V_{R_2T_2}}} = \frac{\xi_{R_1}}{\xi_{R_2}} \eta_2 e^{i(\delta\varphi_2 + \phi_{R_1} - \phi_{R_2})}. \tag{5}$$

The intrinsic receiver efficiency and phase can be eliminated by combining equations (4) and (5) to get:

$$\sqrt{\frac{V_{R_2T_1}}{V_{R_1T_1}} \frac{V_{R_1T_2}}{V_{R_2T_2}}} = \sqrt{\eta_1\eta_2}\, e^{i(\delta\varphi_1 + \delta\varphi_2)/2}. \tag{6}$$

Equation (6) therefore represents a way of compensating for variations in intrinsic efficiency and phase and to obtain correct attenuation and phase shift measurements. Accordingly, attenuation and phase shift measurements may be preferred over direct amplitude and phase measurements, because the intrinsic circuit biases can be eliminated.

In the next portion of the discussion, a simplified model of the tool is used to determine a method for steering measured attenuation and phase differences. The resulting method can also be applied to attenuation and phase differences measured by a compensated tool as previously described.

Figure 4:
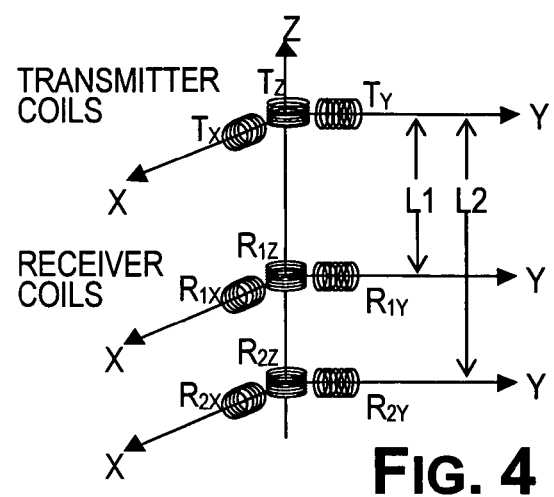
FIG. 4 shows a model induction tool having transmitter and receiver "triads"

FIG. 4 shows a conceptual sketch of a coil arrangement for a downhole induction tool. A triad of transmitter coils $T_x$, $T_y$ and $T_z$, each oriented along a respective axis, is provided. Two triads of similarly oriented receiver coils ($R_{1x}$, $R_{1y}$, $R_{1z}$) and ($R_{2x}$, $R_{2y}$, $R_{2z}$) are also provided, separated from the transmitter triad by L1 and L2, respectively. Each of the coils in the triads is parallel to the corresponding coils of the other triads, and the triads are spaced apart in the z-axis direction. The receiver coil voltages $V_{Rj}$ can be expressed in terms of the transmitter coil voltages $V_T$ as follows:

$$V_{Rj} = C_j V_T, \tag{7}$$

where $C_j$ is the coupling matrix between the transmitter triad and receiver triad $R_j$, j=1,2. In terms of each of the coils in the triad, the voltages are:

$$\begin{bmatrix} V_{R_{jx}} \\ V_{R_{jy}} \\ V_{R_{jz}} \end{bmatrix} = \begin{bmatrix} C_{jxx} & C_{jxy} & C_{jxz} \\ C_{jyx} & C_{jyy} & C_{jyz} \\ C_{jzx} & C_{jzy} & C_{jzz} \end{bmatrix} \begin{bmatrix} V_{T_x} \\ V_{T_y} \\ V_{T_z} \end{bmatrix}. \tag{8}$$

The coupling matrix elements have three subscripts. The first subscript refers to the receiver triad, i.e. $R_1$ or $R_2$. The second subscript refers to the particular coil of the receiver triad, i.e. $R_{1x}$, $R_{1y}$, or $R_{1z}$. The third subscript refers to the particular coil of the transmitter triad, i.e. $T_x$, $T_y$, or $T_z$. Hence, $C_{2xy}$ refers to the coupling between transmitter coil $T_y$ and receiver coil $R_{2x}$.

From the elements of the coupling matrix, the response of an arbitrarily oriented receiver coil to an arbitrarily oriented transmitter coil can be synthesized. The coupling between a transmitter coil oriented at an azimuthal ("strike") angle of $\phi$ and an elevational ("dip") angle of $\theta$, and a receiver coil oriented at the same azimuthal and elevational angles, is:

$$C_j(\varphi, \theta) = \sin\theta\cos\varphi(C_{jxx}\sin\theta\cos\varphi + C_{jxy}\sin\theta\sin\varphi + C_{jxz}\cos\theta) + \tag{9}$$
$$\sin\theta\sin\varphi(C_{jyx}\sin\theta\cos\varphi + C_{jyy}\sin\theta\sin\varphi + C_{jyz}\cos\theta) +$$
$$\cos\theta(C_{jzx}\sin\theta\cos\varphi + C_{jzy}\sin\theta\sin\varphi + C_{jzz}\cos\theta)$$

Equations (8) and (9) apply to direct amplitude and phase measurements. To apply these equations to attenuation and phase difference measurements, we make the following definitions:

$$V_{R_{2x}}/V_{R_{1x}} = \zeta, \tag{10}$$
$$V_{R_{2y}}/V_{R_{1y}} = \varepsilon, \text{ and}$$
$$V_{R_{2z}}/V_{R_{1z}} = \gamma.$$

When the transmitters are separately and individually fired, the following ratios can be measured:

$$\begin{bmatrix} \frac{C_{2xx}}{C_{1xx}} & \frac{C_{2xy}}{C_{1xy}} & \frac{C_{2xz}}{C_{1xz}} \\ \frac{C_{2yx}}{C_{1yx}} & \frac{C_{2yy}}{C_{1yy}} & \frac{C_{2yz}}{C_{1yz}} \\ \frac{C_{2zx}}{C_{1zx}} & \frac{C_{2zy}}{C_{1zy}} & \frac{C_{2zz}}{C_{1zz}} \end{bmatrix}. \tag{11}$$

The elements of this coupling matrix can be determined by a tool that measures attenuation and phase difference of signals induced by the transmitters firing in turn.

Equations (7) and (9) can be combined to determine the attenuation and phase difference between two receivers oriented at arbitrary azimuthal and elevational angles that is caused by a transmitter oriented at the same azimuthal and elevational angles. The ratio is:

$$\frac{C_2(\varphi, \theta)}{C_1(\varphi, \theta)} = \frac{\begin{aligned}&\sin\theta\cos\varphi(C_{2xx}\sin\theta\cos\varphi + C_{2xy}\sin\theta\sin\varphi + \\ &C_{2xz}\cos\theta) + \sin\theta\sin\varphi(C_{2yx}\sin\theta\cos\varphi + \\ &C_{2yy}\sin\theta\sin\varphi + C_{2yz}\cos\theta) + \cos\theta \\ &(C_{2zx}\sin\theta\cos\varphi + C_{2zy}\sin\theta\sin\varphi + C_{2zz}\cos\theta)\end{aligned}}{\begin{aligned}&\sin\theta\cos\varphi(C_{1xx}\sin\theta\cos\varphi + C_{1xy}\sin\theta\sin\varphi + \\ &C_{1xz}\cos\theta) + \sin\theta\sin\varphi(C_{1yx}\sin\theta\cos\varphi + \\ &C_{1yy}\sin\theta\sin\varphi + C_{1yz}\cos\theta) + \cos\theta \\ &(C_{1zx}\sin\theta\cos\varphi + C_{1zy}\sin\theta\sin\varphi + C_{1zz}\cos\theta)\end{aligned}} \tag{12}$$

One way of rewriting this ratio is:

$$\frac{C_2(\varphi,\theta)}{C_1(\varphi,\theta)} = \frac{C_{2zz}}{C_{1zz}} \frac{\begin{aligned}&\frac{C_{2xz}}{C_{2zz}}\sin\theta\cos\varphi\left(\frac{C_{2xx}}{C_{2xz}}\sin\theta\cos\varphi + \frac{C_{2xy}}{C_{2xz}}\sin\theta\sin\varphi + \cos\theta\right) + \frac{C_{2yz}}{C_{2zz}}\sin\theta\sin\varphi\left(\frac{C_{2yx}}{C_{2yz}}\sin\theta\cos\varphi + \frac{C_{2yy}}{C_{2yz}}\sin\theta\sin\varphi + \cos\theta\right) + \cos\theta \\ &\left(\frac{C_{2zx}}{C_{2zz}}\sin\theta\cos\varphi + \frac{C_{2zy}}{C_{2zz}}\sin\theta\sin\varphi + \cos\theta\right)\end{aligned}}{\begin{aligned}&\frac{C_{1xz}}{C_{1zz}}\sin\theta\cos\varphi\left(\frac{C_{1xx}}{C_{1xz}}\sin\theta\cos\varphi + \frac{C_{1xy}}{C_{1xz}}\sin\theta\sin\varphi + \cos\theta\right) + \frac{C_{1yz}}{C_{1zz}}\sin\theta\sin\varphi\left(\frac{C_{1yx}}{C_{1yz}}\sin\theta\cos\varphi + \frac{C_{1yy}}{C_{1yz}}\sin\theta\sin\varphi + \cos\theta\right) + \cos\theta \\ &\left(\frac{C_{1zx}}{C_{1zz}}\sin\theta\cos\varphi + \frac{C_{1zy}}{C_{1zz}}\sin\theta\sin\varphi + \cos\theta\right)\end{aligned}} \tag{13}$$

Accordingly, if the following ratios can be determined, the steered ratio of equation (13) can be evaluated. The ratios are:

$$\left\{\frac{C_{2zz}}{C_{1zz}}\right\}, \left\{\frac{C_{jxx}}{C_{jxz}}, \frac{C_{jxy}}{C_{jxz}}, \frac{C_{jyx}}{C_{jyz}}, \frac{C_{jyy}}{C_{jyz}}, \frac{C_{jzx}}{C_{jzz}}, \frac{C_{jzy}}{C_{jzz}}\right\}, \left\{\frac{C_{jxz}}{C_{jzz}}, \frac{C_{jyz}}{C_{jzz}}\right\}, j = 1, 2$$

The first ratio set is known from measurements (11). It is noted that in the second ratio set, the coupling matrix elements are for the same receiver, but different transmitters, whereas in the third ratio set, the coupling matrix elements are for different receivers, but the same transmitter.

These ratios can be determined from measurements made when two transmitters are simultaneously fired. In the following derivation, the notation of equation (10) is preserved, but a subscript is added. The measurements made when transmitters $T_x$ and $T_z$ are energized simultaneously are denoted $\zeta_1$, $\epsilon_1$, and $\gamma_1$. The measurements made when transmitters $T_y$ and $T_z$ are energized simultaneously are denoted $\zeta_2$, $\epsilon_2$, and $\gamma_2$. The following relationships can be manipulated to reach the results shown:

$$\zeta_1 = \frac{C_{2xx} + C_{2xz}}{C_{1xx} + C_{1xz}} \Rightarrow \frac{C_{1xx}}{C_{1xz}} = \frac{\left[\frac{C_{2xz}}{C_{1xz}}\right] - \zeta_1}{\zeta_1 - \left[\frac{C_{2xx}}{C_{1xx}}\right]}. \tag{14}$$

$$\zeta_1 = \frac{C_{2xx} + C_{2xz}}{C_{1xx} + C_{1xz}} \Rightarrow \frac{C_{2xx}}{C_{2xz}} = \frac{\left[\frac{C_{1xz}}{C_{2xz}}\right] - \frac{1}{\zeta_1}}{\frac{1}{\zeta_1} - \left[\frac{C_{1xx}}{C_{2xx}}\right]}. \tag{15}$$

$$\epsilon_1 = \frac{C_{2yx} + C_{2yz}}{C_{1yx} + C_{1yz}} \Rightarrow \frac{C_{1yx}}{C_{1yz}} = \frac{\left[\frac{C_{2yz}}{C_{1yz}}\right] - \epsilon_1}{\epsilon_1 - \left[\frac{C_{2yx}}{C_{1yx}}\right]}. \tag{16}$$

$$\epsilon_1 = \frac{C_{2yx} + C_{2yz}}{C_{1yx} + C_{1yz}} \Rightarrow \frac{C_{2yx}}{C_{2yz}} = \frac{\left[\frac{C_{1yz}}{C_{2yz}}\right] - \frac{1}{\epsilon_1}}{\frac{1}{\epsilon_1} - \left[\frac{C_{1yx}}{C_{2yx}}\right]}. \tag{17}$$

$$\gamma_1 = \frac{C_{2zx} + C_{2zz}}{C_{1zx} + C_{1zz}} \Rightarrow \frac{C_{1zx}}{C_{1zz}} = \frac{\left[\frac{C_{2zz}}{C_{1zz}}\right] - \gamma_1}{\gamma_1 - \left[\frac{C_{2zx}}{C_{1zx}}\right]}. \tag{18}$$

$$\gamma_1 = \frac{C_{2zx} + C_{2zz}}{C_{1zx} + C_{1zz}} \Rightarrow \frac{C_{2zx}}{C_{2zz}} = \frac{\left[\frac{C_{1zz}}{C_{2zz}}\right] - \frac{1}{\gamma_1}}{\frac{1}{\gamma_1} - \left[\frac{C_{1zx}}{C_{2zx}}\right]}. \tag{19}$$

$$\zeta_2 = \frac{C_{2xy} + C_{2xz}}{C_{1xy} + C_{1xz}} \Rightarrow \frac{C_{1xy}}{C_{1xz}} = \frac{\left[\frac{C_{2xz}}{C_{1xz}}\right] - \zeta_2}{\zeta_2 - \left[\frac{C_{2xy}}{C_{1xy}}\right]}. \tag{20}$$

$$\zeta_2 = \frac{C_{2xy} + C_{2xz}}{C_{1xy} + C_{1xz}} \Rightarrow \frac{C_{2xy}}{C_{2xz}} = \frac{\left[\frac{C_{1xz}}{C_{2xz}}\right] - \frac{1}{\zeta_2}}{\frac{1}{\zeta_2} - \left[\frac{C_{1xy}}{C_{2xy}}\right]}. \tag{21}$$

$$\epsilon_2 = \frac{C_{2yy} + C_{2yz}}{C_{1yy} + C_{1yz}} \Rightarrow \frac{C_{1yy}}{C_{1yz}} = \frac{\left[\frac{C_{2yz}}{C_{1yz}}\right] - \epsilon_2}{\epsilon_2 - \left[\frac{C_{2yy}}{C_{1yy}}\right]}. \tag{22}$$

$$\epsilon_2 = \frac{C_{2yy} + C_{2yz}}{C_{1yy} + C_{1yz}} \Rightarrow \frac{C_{2yy}}{C_{2yz}} = \frac{\left[\frac{C_{1yz}}{C_{2yz}}\right] - \frac{1}{\epsilon_2}}{\frac{1}{\epsilon_2} - \left[\frac{C_{1yy}}{C_{2yy}}\right]}. \tag{23}$$

$$\gamma_2 = \frac{C_{2zy} + C_{2zz}}{C_{1zy} + C_{1zz}} \Rightarrow \frac{C_{1zy}}{C_{1zz}} = \frac{\left[\frac{C_{2zz}}{C_{1zz}}\right] - \gamma_2}{\gamma_2 - \left[\frac{C_{2zy}}{C_{1zy}}\right]}. \tag{24}$$

$$\gamma_2 = \frac{C_{2zy} + C_{2zz}}{C_{1zy} + C_{1zz}} \Rightarrow \frac{C_{2zy}}{C_{2zz}} = \frac{\left[\frac{C_{1zz}}{C_{2zz}}\right] - \frac{1}{\gamma_2}}{\frac{1}{\gamma_2} - \left[\frac{C_{1zy}}{C_{2zy}}\right]}. \tag{25}$$

Note that each of the bracketed terms is known from measurements (11). Thus each of the ratios in the second ratio set can be determined.

With regard to the third ratio set, the four ratios are related as follows:

$$\frac{C_{2xz}}{C_{2zz}} = \left[\frac{C_{2xz}}{C_{1xz}}\right]\left[\frac{C_{1zz}}{C_{2zz}}\right]\frac{C_{1xz}}{C_{1zz}}. \tag{26}$$

$$\frac{C_{2yz}}{C_{2zz}} = \left[\frac{C_{2yz}}{C_{1yz}}\right]\left[\frac{C_{1zz}}{C_{2zz}}\right]\frac{C_{1yz}}{C_{1zz}}. \tag{27}$$

where, as before, the bracketed terms are known from measurement (11). So, the determination of two of these ratios allows the calculation of the remaining two.

These ratios may be measured directly from the ratio between voltages induced in the $R_{jx}$ and $R_{jz}$ coils, $j=1, 2$, and the ratio between voltages induced in the $R_{jy}$ and $R_{jz}$ coils, $j=1, 2$, in the same receiver triad. Alternatively, these ratios may be rewritten in terms of attenuation between triads:

$$\frac{C_{1xz}}{C_{1zz}} = \left[\frac{C_{1xz}}{C_{2xz}}\right]\frac{C_{2xz}}{C_{1zz}}. \tag{28}$$

$$\frac{C_{1yz}}{C_{1zz}} = \left[\frac{C_{1yz}}{C_{2yz}}\right]\frac{C_{2yz}}{C_{1zz}}. \tag{29}$$

Again, the bracketed terms are known from measurements in (11). The ratio between voltages induced in the $R_{jx}$ and $R_{kz}$ coils, $j \neq k$, and the ratio between voltages induced in the $R_{jy}$ and $R_{kz}$ coils, $j \neq k$, may be directly measured. This latter method offers the possibility of better compensation in the final system.

Figure 5:
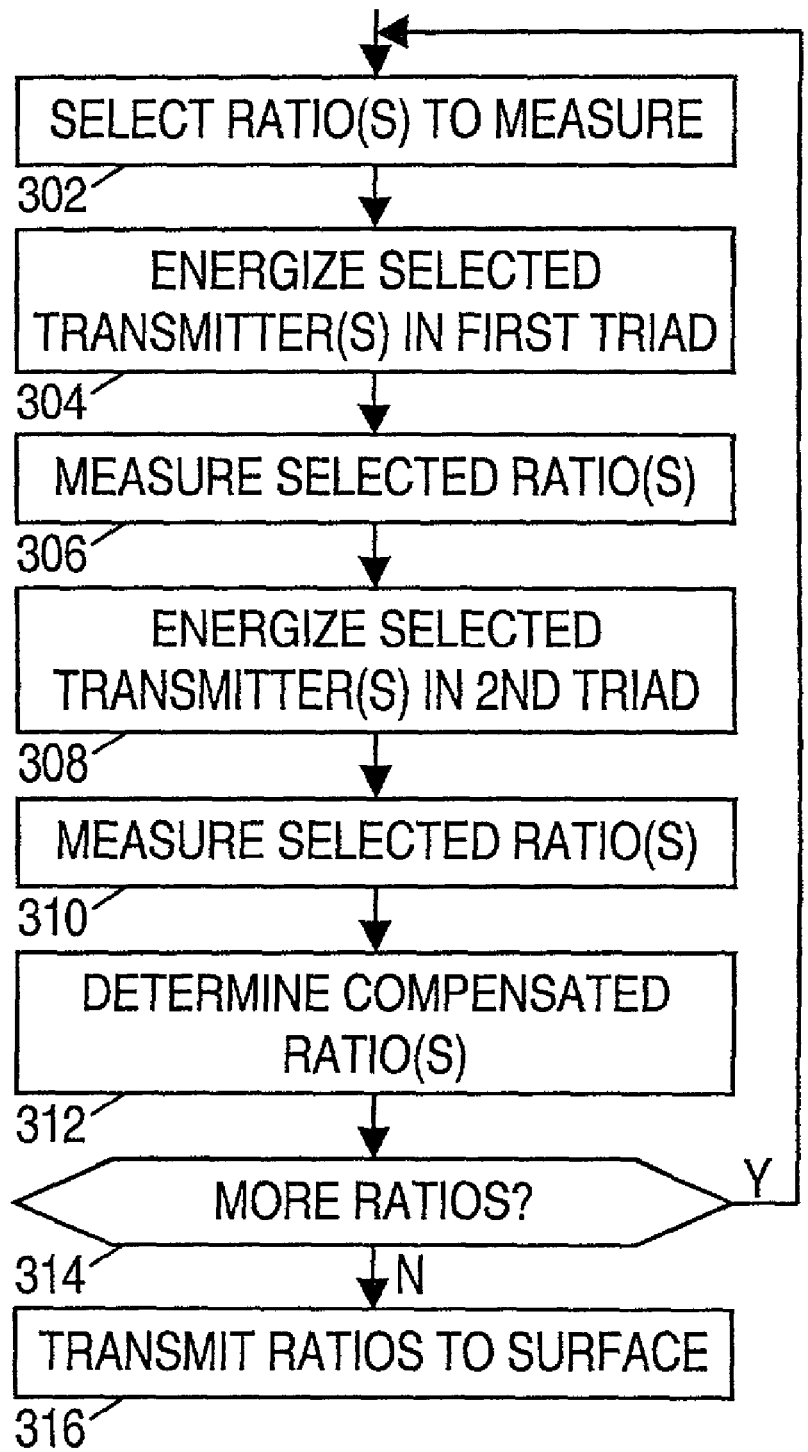
FIG. 5 shows a flow diagram for the disclosed method of determining a steerable attenuation and phase difference.

FIG. 5 shows a flow diagram of a method for determining a steerable coupling ratio. To evaluate equation (13), the following seventeen ratios are measured:

$$\left\{\frac{C_{2xx}}{C_{1xx}}, \frac{C_{2xy}}{C_{1xy}}, \frac{C_{2xz}}{C_{1xz}}, \frac{C_{2yx}}{C_{1yx}}, \frac{C_{2yy}}{C_{1yy}}, \frac{C_{2yz}}{C_{1yz}}, \frac{C_{2zx}}{C_{1zx}}, \frac{C_{2zy}}{C_{1zy}}, \frac{C_{2zz}}{C_{1zz}}\right\},$$

$$\{\zeta_1, \varepsilon_1, \gamma_1, \zeta_2, \varepsilon_2, \gamma_2\}, \left\{\frac{C_{jxz}}{C_{kzz}}, \frac{C_{jyz}}{C_{kzz}}\right\}$$

where j=1 and k∈ {1,2}, as in equations (28), (29). Many of these may be measured in parallel. For example, in a compensated tool such as that shown in FIG. 3, $C_{2xz}/C_{1xz}$, $C_{2yz}/C_{1yz}$, $C_{2zz}/C_{1zz}$, $C_{jxz}/C_{kzz}$, and $C_{jyz}/C_{kzz}$, can be measured together when each of the $T_z$ transmitters are fired. Similarly, $C_{2xy}/C_{1xy}$, $C_{2yy}/C_{1yy}$, and $C_{2zy}/C_{1zy}$, can be measured together when each of the $T_y$ transmitters are fired. $C_{2xx}/C_{1xx}$ and $C_{2yx}/C_{1yx}$ can be measured together when each of the $T_x$ transmitters are fired. $\zeta_1$, $\epsilon_1$, and $\gamma_1$ can be measured together when transmitters $T_x$ and $T_z$ are energized simultaneously, and $\zeta_2$, $\epsilon_2$, and $\gamma_2$ can be measured together when transmitters $T_y$ and $T_z$ are energized simultaneously. Hence, no more than five iterations of the loop in FIG. 5 are necessary for each measurement interval.

The loop of FIG. 5 includes blocks 302-314. The ratios to be measured in each iteration of the loop are identified in block 302. In block 304, the appropriate transmitters from the first triad are energized, and in block 306 the selected ratios are measured. In block 308 the appropriate transmitters from the second triad are energized, and in block 310 the selected ratios are again measured. The ratio measurements are combined in block 312 to determine compensated ratios. In block 314, a test is made to determine if all the desired ratios have been measured. If not, the loop repeats. Otherwise, each of the compensated ratios is transmitted to the surface. This process is repeated for each measurement interval.

At the surface, the compensated ratios may be used in equations (14)-(27) to determine the values necessary for equation (13). Equation (13) may then be evaluated for any desired orientation, thereby providing a virtually steered attenuation and phase difference measurement.

For clarity, it has been assumed that the three coils in each triad represent actual coils oriented in mutually perpendicular directions, with the z-axis corresponding to the long axis of the tool. However, it is noted that this coil arrangement can be "synthesized" by performing a suitable transformation on differently oriented triads. Such transformations are described in depth in U.S. patent application Ser. No. 6,181,138 entitled "Directional Resistivity Measurements for Azimuthal Proximity Detection of Bed Boundaries", filed Feb. 22, 1999 by T. Hagiwara and H. Song, which is hereby incorporated herein by reference.

The disclosed method can be utilized to determine regional dip and strike information in wells where conditions are not favorable for the operation of traditional resistivity wireline dipmeters or resistivity imaging tools. Such conditions include, but are not limited to, wells drilled with oil based mud and wells with highly rugose wellbores. It is noted that the disclosed method can be used for both wireline operations and Logging While Drilling (LWD) operations. In LWD operations, the method, in addition to determining regional dip and strike, can be further used to facilitate geosteering in highly deviated and/or horizontal wells.

The new method may provide the following advantages: (1) As an induction apparatus, the current invention can be applied in situations where the condition are not favorable for the focused-current pad dipmeters, e.g., in wells drilled with oil based mud or when the wellbore has high rugosity. (2) The disclosed apparatus may provide a deeper depth of investigation than the microinduction pad dipmeter, and hence may be less vulnerable to adverse borehole conditions. (3) The disclosed apparatus may provide more accurate results because of inherent compensation.

Numerous variations and modifications will become apparent to those skilled in the art once the above disclosure is fully appreciated. It is intended that the following claims be interpreted to embrace all such variations and modifications.

What is claimed is:

1. A logging tool that comprises:

a set of transmitter coils, wherein the set of transmitter coils includes three orthogonally oriented transmitter coils;

a first set of receiver coils separated from the set of transmitter coils by a first distance, wherein the first set of receiver coils includes three orthogonally oriented receiver coils;

wherein the three orthogonally oriented transmitter coils are each parallel to a corresponding one of the three orthogonally oriented receiver coils in the first set of receiver coils;

a second set of receiver coils separated from the set of transmitter coils by a second distance different than the first distance, wherein the second set of receiver coils includes three orthogonally oriented receiver coils each oriented parallel to a corresponding one of the three orthogonally oriented receiver coils in the first set of receiver coils;

a controller that selectively excites transmitter coils in the set of transmitter coils, and gathers a set of measurements of attenuation and phase differences between signals received by the first set of receiver coils and signals received by the second set of receiver coils;

the set of measurements is utilizable as a sole input data set to determine an attenuation and phase difference measurement associated with any virtual orientation of the transmitter coils relative to the receiver coils, for any transmitter coil orientation;

wherein the logging tool has a long axis, wherein the set of transmitter coils, the first set of receiver coils, and the second set of receiver coils each have a coil oriented along the long axis, herein respectively represented by $T_z$, $R_{1z}$, $R_{2z}$, wherein the set of transmitter coils, the first set of receiver coils, and the second set of receiver coils each have two coils oriented perpendicular to the long axis, herein respectively represented by $T_x$ and $T_y$, $R_{1x}$ and $R_{1y}$, $R_{2x}$ and $R_{2y}$, and wherein the controller separately excites each of the transmitter coils to determine measurements of the following ratios:

$$\left\{\frac{C_{2xx}}{C_{1xx}}, \frac{C_{2xy}}{C_{1xy}}, \frac{C_{2xz}}{C_{1xz}}, \frac{C_{2yx}}{C_{1yx}}, \frac{C_{2yy}}{C_{1yy}}, \frac{C_{2yz}}{C_{1yz}}, \frac{C_{2zx}}{C_{1zx}}, \frac{C_{2zy}}{C_{1zy}}, \frac{C_{2zz}}{C_{1zz}}\right\},$$

where $C_{juv}$ denotes the electromagnetic coupling between the transmitter $T_v$ (V ∈{x,y,z}) and receiver $R_{ju}$ (j ∈{1,2}, and u ∈{x,y,z}).

2. The logging tool of claim 1, wherein the controller also determines measurements of the following ratios:

$$\left\{\frac{C_{jxz}}{C_{kzz}}, \frac{C_{myz}}{C_{nzz}}\right\}$$

where j, k, m, and n, each have at least one predetermined value from the set {1, 2}.

3. The logging tool of claim 1, wherein the controller jointly excites $T_x$ and $T_z$ to determine measurements of the following ratios:

$$\left\{\frac{C_{2xx}+C_{2xz}}{C_{1xx}+C_{1xz}}, \frac{C_{2yx}+C_{2yz}}{C_{1yx}+C_{1yz}}, \frac{C_{2zx}+C_{2zz}}{C_{1zx}+C_{1zz}}\right\}$$

and jointly excites $T_y$ and $T_z$ to determine measurements of the following ratios:

$$\left\{\frac{C_{2xy}+C_{2xz}}{C_{1xy}+C_{1xz}}, \frac{C_{2yy}+C_{2yz}}{C_{1yy}+C_{1yz}}, \frac{C_{2zy}+C_{2zz}}{C_{1zy}+C_{1zz}}\right\}.$$

4. A borehole logging method that comprises:
passing a logging tool along the borehole, wherein the logging tool has a first triad of orthogonal receivers and a second, different triad of orthogonal receivers;
wherein the logging tool has a long axis,
wherein the logging tool has a triad of orthogonal transmitter coils,
wherein the transmitter triad, the first receiver triad, and the second receiver triad each have an element oriented along the long axis, herein respectively represented by $T_z$, $R_{1z}$, $R_{2z}$,
wherein transmitter triad further includes two elements, herein represented by $T_x$ and $T_y$, that are orthogonal to each other and orthogonal to $T_z$, wherein the first receiver triad includes two elements, herein represented by $R_{1x}$ and $R_{1y}$ that are oriented parallel to $T_x$ and $T_y$ respectively, wherein the second receiver triad includes two elements, herein represented by $R_{2x}$ and $R_{2y}$, that are also oriented parallel to $T_x$ and $T_y$ respectively;
gathering a set of measurements at each of a plurality of points along the borehole, wherein each set of measurements includes ratios between signals from receivers in the first triad and signals from receivers in the second triad;
wherein said gathering includes:
separately exciting each of $T_x$, $T_y$, and $T_z$ to determine measurements of the following ratios:

$$\left\{\frac{C_{2xx}}{C_{1xx}}, \frac{C_{2xy}}{C_{1xy}}, \frac{C_{2xz}}{C_{1xz}}, \frac{C_{2yx}}{C_{1yx}}, \frac{C_{2yy}}{C_{1yy}}, \frac{C_{2yz}}{C_{1yz}}, \frac{C_{2zy}}{C_{1zy}}, \frac{C_{2zz}}{C_{1zz}}\right\},$$

where $C_{juv}$ denotes the electromagnetic coupling between element $T_v$ (v ∈ {x,y,z}) and element $R_{ju}$ (j ∈ {1,2}, and u ∈ {x,y,z});
utilizing the set of measurements as a sole input data set to determine an attenuation value and phase difference value at any orientation of virtual receivers relative to virtual transmitters, for any transmitter coil orientation.

5. The method of claim 4, wherein said gathering further includes:
determining measurements of ratios $$\left\{\frac{C_{jxz}}{C_{kzz}}, \frac{C_{myz}}{C_{nzz}}\right\},$$

where j, k, m, and n, each have a predetermined value from the set {1,2}.

6. The method of claim 4, wherein said gathering further includes:
jointly exciting $T_x$ and $T_z$ to determine measurements of the following ratios:

$$\left\{\frac{C_{2xx}+C_{2xz}}{C_{1xx}+C_{1xz}}, \frac{C_{2yx}+C_{2yz}}{C_{1yx}+C_{1yz}}, \frac{C_{2zx}+C_{2zz}}{C_{1zx}+C_{1zz}}\right\}; \text{ and}$$

jointly exciting $T_y$ and $T_z$ to determine measurements of the following ratios:

$$\left\{\frac{C_{2xy}+C_{2xz}}{C_{1xy}+C_{1xz}}, \frac{C_{2yy}+C_{2yz}}{C_{1yy}+C_{1yz}}, \frac{C_{2zy}+C_{2zz}}{C_{1zy}+C_{1zz}}\right\}.$$

* * * * *